United States Patent
Uchiyama et al.

(10) Patent No.: US 7,539,411 B2
(45) Date of Patent: May 26, 2009

(54) IMAGING DEVICE, LOCATION INFORMATION RECORDING METHOD, AND COMPUTER PROGRAM PRODUCT

(75) Inventors: Hiroaki Uchiyama, Kanagawa (JP); Naoki Tsunoda, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 396 days.

(21) Appl. No.: 11/641,219

(22) Filed: Dec. 18, 2006

(65) Prior Publication Data

US 2007/0200862 A1 Aug. 30, 2007

(30) Foreign Application Priority Data

Dec. 26, 2005 (JP) ............................. 2005-372331
Nov. 22, 2006 (JP) ............................. 2006-315887

(51) Int. Cl.
*G03B 17/24* (2006.01)
*G03B 29/00* (2006.01)

(52) U.S. Cl. ...................... 396/310; 396/429; 348/116; 348/231.3

(58) Field of Classification Search ................ 396/310, 396/56, 50, 429, 263; 348/116, 107, 333.01–333.02, 348/231.3; 701/207–223
See application file for complete search history.

(56) References Cited

U.S. PATENT DOCUMENTS

| | | | | |
|---|---|---|---|---|
| 5,506,644 A * | 4/1996 | Suzuki et al. ............... 396/319 |
| 5,913,078 A * | 6/1999 | Kimura et al. .............. 396/50 |
| 6,160,964 A * | 12/2000 | Imoto ........................ 396/300 |
| 6,999,112 B2 * | 2/2006 | Seaman et al. ........... 348/207.1 |
| 7,145,597 B1 * | 12/2006 | Kinjo ...................... 348/222.1 |
| 7,242,791 B2 * | 7/2007 | Han et al. .................. 382/104 |
| 2002/0191087 A1 * | 12/2002 | Hashimoto et al. ....... 348/231.3 |
| 2003/0081126 A1 * | 5/2003 | Seaman et al. ........... 348/207.1 |
| 2003/0185549 A1 * | 10/2003 | Partynski et al. ............ 396/7 |
| 2004/0174434 A1 * | 9/2004 | Walker et al. ............ 348/211.3 |
| 2006/0110154 A1 * | 5/2006 | Hulsen et al. .............. 396/310 |

FOREIGN PATENT DOCUMENTS

EP 1566743 A1 8/2005
JP 2004-357343 12/2004

OTHER PUBLICATIONS

Jan. 25, 2008 Chinese official action (with English translation) in connection with corresponding Chinese patent application No. 2006101699517.

* cited by examiner

*Primary Examiner*—Christopher E Mahoney
*Assistant Examiner*—Bret Adams
(74) *Attorney, Agent, or Firm*—Cooper & Dunham, LLP

(57) ABSTRACT

A location-information storing unit stores therein location information. A location-information acquiring unit-acquires the location information from a location detecting device that detects a current location, and stores acquired location information in the location-information storing unit. An image storing unit stores an image in an image storing unit with stored location information.

14 Claims, 9 Drawing Sheets

IMAGING DEVICE, LOCATION INFORMATION RECORDING METHOD, AND COMPUTER PROGRAM PRODUCT

CROSS-REFERENCE TO RELATED APPLICATIONS

The present document incorporates by reference the entire contents of Japanese priority documents, 2005-372331 filed in Japan on Dec. 26, 2005 and 2006-315887 filed in Japan on Nov. 22, 2006.

BACKGROUND OF THE INVENTION

1. Field of the Invention

The present invention relates to an imaging device, a location-information recording method, and a computer program product.

2. Description of the Related Art

Recently, use of a geographical information system (GIS) for acquiring location information is widening along with the prevalence of portable global positioning system (GPS) receivers. The GIS is used for various purposes, for example, survey of fire disasters, real estate, road repairs, and the likes, and the demand is predicted to grow in the future.

The same system is also used in a digital camera, for example, taking photographs of a fire disaster site with the digital camera helps in writing a report related to the disaster at a later stage, by associating map data acquired from the GIS during the survey of the fire disaster site. Thus, there is a need to establish a relation between an image taken by the digital camera and the location information acquired from the GIS.

In response to such a need, a technology relating to the digital camera connected to a GPS receiver is published in Japanese Patent Application Laid-Open No. 2004-357343. The location information received from the GPS receiver, is inputted into the digital camera, and is included in a header portion of the image in the digital camera. According to the technology, the location information of the image is recorded in the same image file, which streamlines management of the image file.

However, the GPS receiver is generally useful only outdoors, and when a photograph is taken indoors, it is impossible to store the location information on the image.

SUMMARY OF THE INVENTION

It is an object of the present invention to at least partially solve the problems in the conventional technology.

An imaging device according to one aspect of the present invention includes a location-information storing unit that stores therein location information; a location-information acquiring unit that acquires the location information from a location detecting device that detects a current location, and stores acquired location information in the location-information storing unit; and an image storing unit that stores an image in an image storing unit with stored location information.

A method of recording location information, according to another aspect of the present invention includes acquiring the location information from a location detecting device that detects a current location; storing acquired location information in a location-information storing unit; and storing an image in an image storing unit with stored location information.

A computer program product according to still another aspect of the present invention includes a computer usable medium having computer readable program codes embodied in the medium that when executed cause a computer to execute acquiring the location information from a location detecting device that detects a current location; storing acquired location information in a location-information storing unit; and storing an image in an image storing unit with stored location information.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments according to the present invention will be explained in detail below-with reference to the accompanying drawings. Although the invention has been described with respect to a specific embodiment of the imaging device, that is, a digital camera, the application of the invention is not necessarily limited to the digital camera, and can be applied to other imaging devices, for example, a portable terminal.

Figure 1:
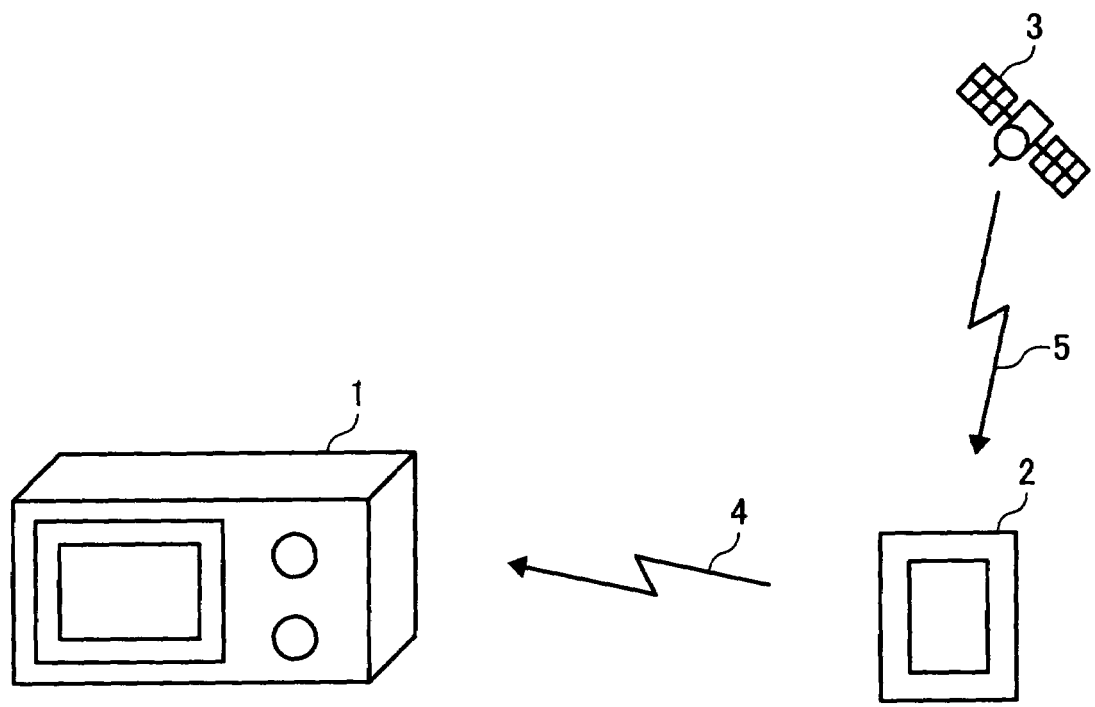
FIG. 1 is a schematic for explaining a configuration of a geographic information service (GIS) system according to an embodiment of the present invention.

FIG. 1 is a schematic for explaining a configuration of a geographic information service (GIS) system according to an embodiment of the present invention. The GIS system according to the present embodiment includes a digital camera 1, a global positioning system (GPS) receiver 2, which is compatible with the Bluetooth (registered trademark) standards, and a GPS satellite 3 for acquiring location information.

The digital camera 1 includes a communication device for acquiring location information from the GPS receiver 2. According to the present embodiment, a wireless transmission device compatible with Bluetooth (registered trademark) standards is used as the communication device. The digital camera 1 and the GPS receiver 2 are connected with each other by a communication medium 4. The GPS receiver 2 and the GPS satellite 3 are connected with each other by a GPS medium 5.

The wireless transmission device such as Bluetooth (registered trademark) and a wired cable network such as RS232 are some of the examples that fall under the category of the communication medium 4. When a CompactFlash (registered trademark) card is used as a location detecting unit, in place of the GPS receiver 2, the communication medium 4 is a connecting part of the CompactFlash card and the digital camera 1.

Figure 2:
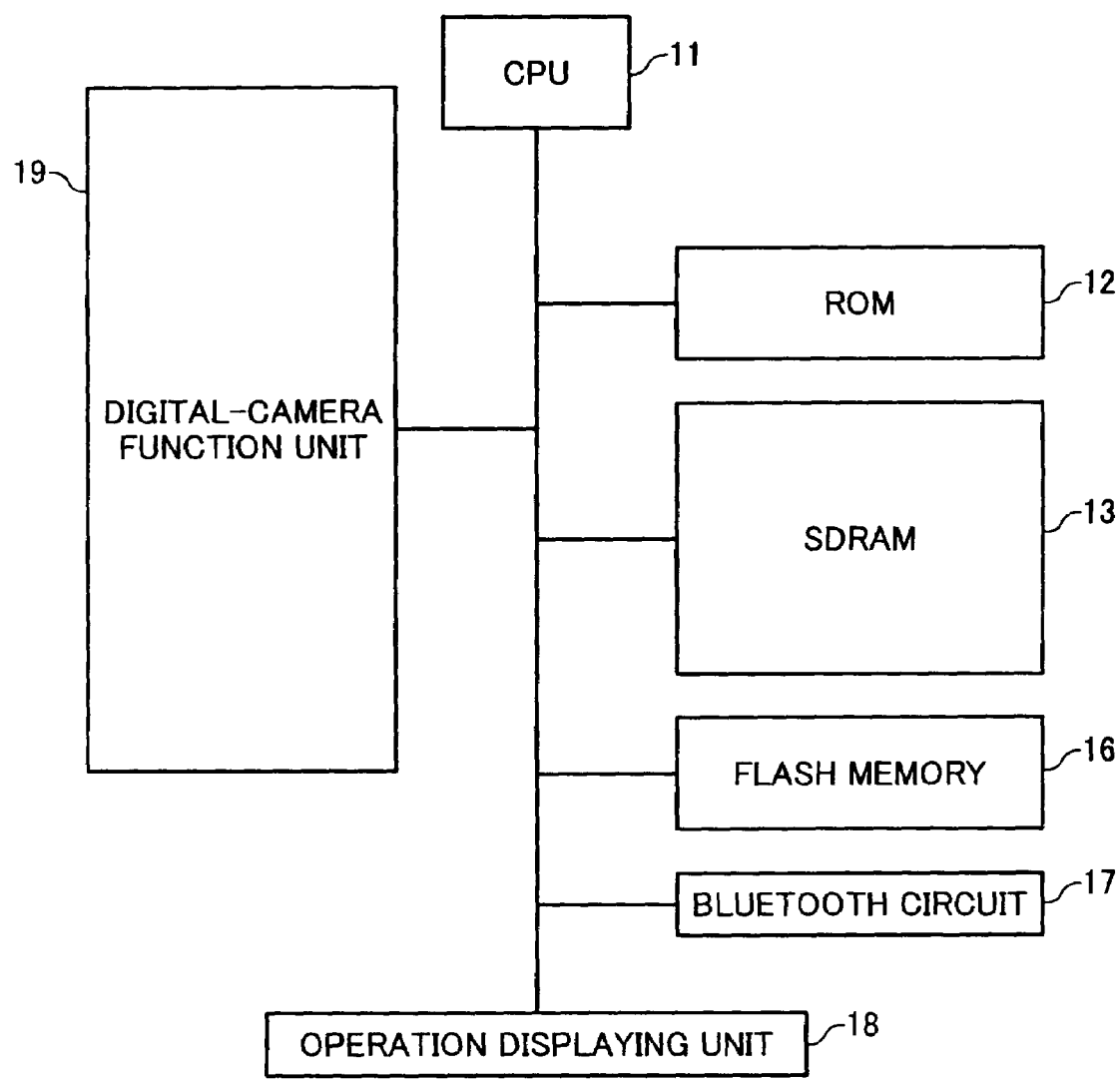
FIG. 2 is a block diagram of a hardware configuration of a digital camera according to the present embodiment.

FIG. 2 is a block diagram of a hardware configuration of the digital camera 1 according to the present embodiment. A central processing unit (CPU) 11 controls the digital camera 1. A read only memory (ROM) 12 stores programs that can execute control according to the present invention. A synchronous dynamic random access memory (SDRAM) 13 is a storage medium, which is able to store the location information (GPS location information) acquired from the GPS receiver 2.

A flash memory 16 is a storage medium that saves information related to settings of the digital camera 1, information related to settings of the location-information usage mode, and the image.

A Bluetooth (registered trademark) circuit 17 is a communication circuit that makes wireless transmission possible through a communication method, which is compatible with the Bluetooth (registered trademark) standards, and is used as a communication device for acquiring location information from the GPS receiver 2.

An operation displaying unit 18 is an interface that can display the image or every type of display screen, for example, a liquid crystal display, a key button, a shutter button, a mode dial.

Figure 3:
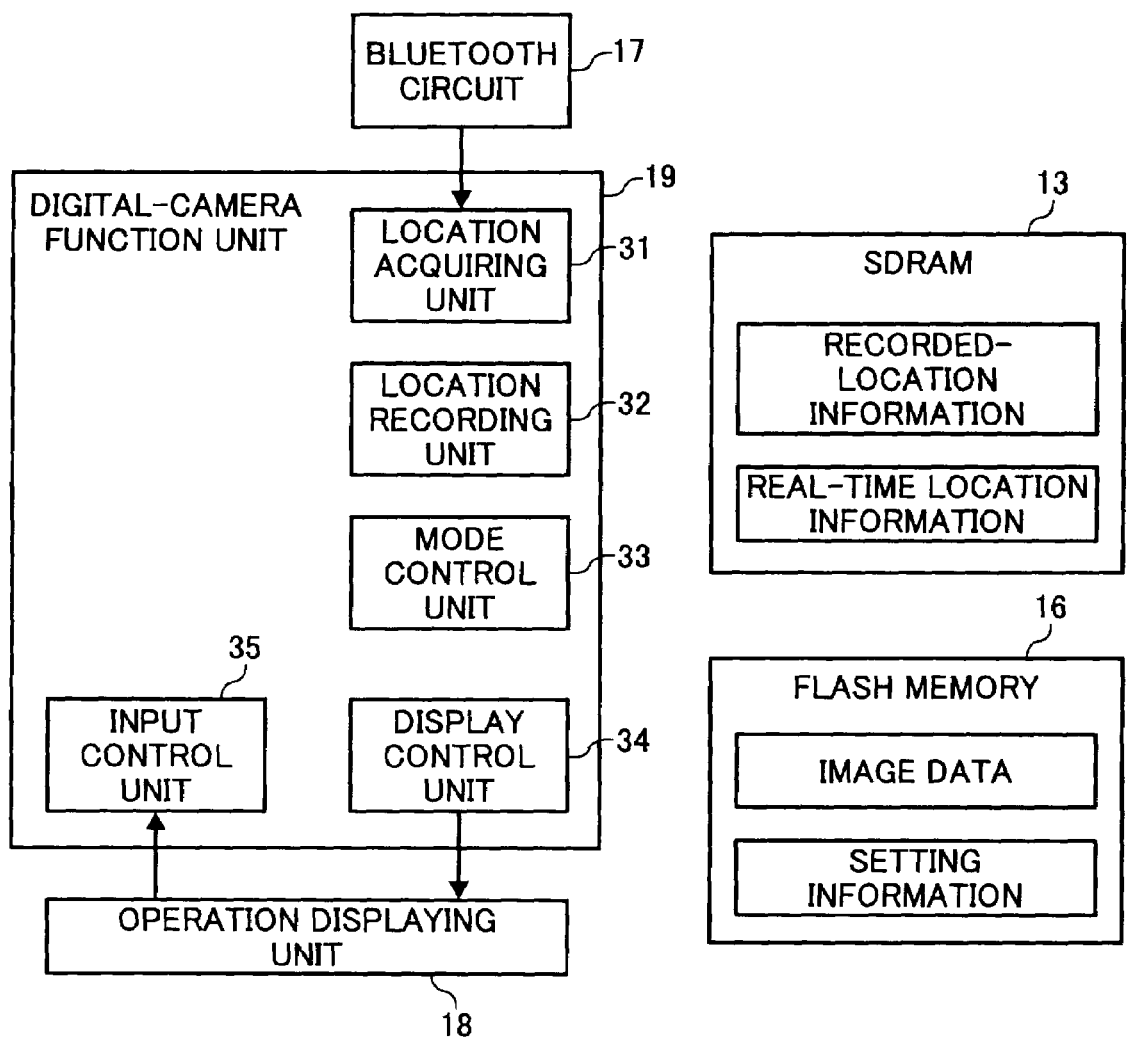
FIG. 3 is a functional block diagram of a digital-camera function unit.

A digital-camera function unit 19 is a processing unit that performs imaging function and location-information recording function. FIG. 3 is a functional block diagram of the digital-camera function unit 19. The digital-camera function unit 19 includes a location-information acquiring unit 31, a location-information recording unit 32, a mode control unit 33, an input control unit 35, and a display control unit 34.

The location-information acquiring unit 31 is a processing unit that periodically acquires current location information from the GPS receiver 2 via a Bluetooth (registered trademark) circuit, and saves the acquired location information in the SDRAM 13. Further, the location-information acquiring unit 31 saves the location information from the operation displaying unit 18, acquired at the time of receiving a storing command given by a user, in the SDRAM 13.

The location information acquired by the location-information acquiring unit 31 is specifically, data containing longitude and latitude. The data is saved temporarily, in the form of real-time location information in the SDRAM 13, and is saved for a fixed time as stored-location information in the SDRAM 13.

The location-information acquiring unit 31 performs the process of deleting the stored-location information saved by the SDRAM 13, when the SDRAM 13 receives an input of a delete time given by the user, from the operation displaying unit 18.

The mode control unit 33 is a processing unit that sets the modes according to location-information usage modes stored in the flash memory 16 as setting information.

The location-information usage modes include a real-time location-information usage mode, a stored-location-information usage mode, and a location-information-combination usage mode.

The real-time location-information usage mode is a mode that records the location information acquired by the location-information acquiring unit 31, only at the time of taking a photograph, in an exchangeable image file format (Exif) header portion of the image.

The stored-location-information usage mode is a mode that records the location information saved in the SDRAM 13, as the stored-location information in the Exif header portion of the image, in spite of ability or inability of the location-information acquiring unit 31 to detect the location information.

The location-information-combination usage mode is a mode that concurrently uses the stored-location information in the Exif header portion of the image detected at the time of taking a photograph and the record in the Exif header portion of the image of the location information stored in the SDRAM 13 as the stored-location information.

Figure 4:
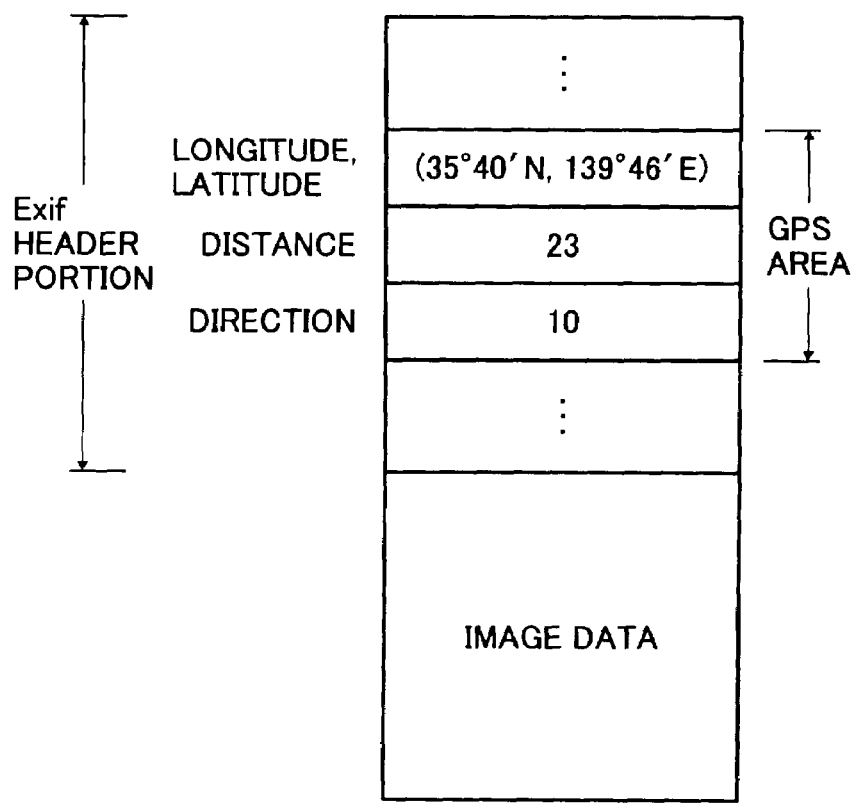
FIG. 4 is a schematic for explaining a data structure of a shot image.

Following is an explanation about the contents of image data. As shown in FIG. 4, the image is made up of the Exif header portion and the image data. The Exif header portion includes header information compatible with the Exif format, and records the location information acquired in a longitude latitude field of a GPS area of the Exif header portion by the location-information acquiring unit 31.

Each of the location-information usage modes is selected by the operation displaying unit 18 according to the setting input from the user.

Further, the mode control unit 33 performs the process of controlling the transition to the stored-location-information usage mode by storing the stored-location-information usage mode as the location-information usage mode in the flash memory 16, at the time when the location information is recorded in the SDRAM 13 by the location-information acquiring unit 31.

Further, the mode control unit 33 performs the process of controlling the transition to the location-information-combination usage mode by saving the location-information-combination usage mode as the information setting in the flash memory 16, at the time point when the location information is recorded in the SDRAM 13 by the location-information acquiring unit 31.

The location-information recording unit 32 is a processing unit that records the location information or the real-time location information, stored in the SDRAM 13, into the Exif header portion of the image, at the time of saving the image in the flash memory 16. Thus, the image is saved in the flash memory 16 along with the location information.

Specifically, when the information setting is set to the real-time location-information usage mode, the location-information recording unit 32 records the real-time location information acquired by the location-information acquiring unit 31, into the Exif header portion of the image.

Further, when the information setting is set to the stored-location-information usage mode, the location-information recording unit 32 records the location information, saved as the stored location information in the SDRAM 13, into the Exif header portion of the image.

When the information setting is set to the location-information-combination usage mode, the location-information recording unit 32 stores the real-time location information detected at the time of taking a photograph, into the Exif header portion of the image, in case detection of location information is possible for the location-information acquiring unit 31 for being outdoors. However, when detection of the location information is not possible for being indoors, the location information stored in the SDRAM 13 is recorded into the Exif header portion of the image.

The display control unit 34 is a processing unit that controls the display of a set-up screen specifying whether the function of the location information acquiring and the location information storing by the GPS is used, a set-up screen for inputting the location-information usage mode setting, a set-up screen for setting the time for deleting the-stored-location information from the SDRAM 13, a set-up screen for the specific input of mode transition, and controls the display of the image with the display of the location information, on the liquid crystal display of the operation displaying unit 18.

Figure 5:
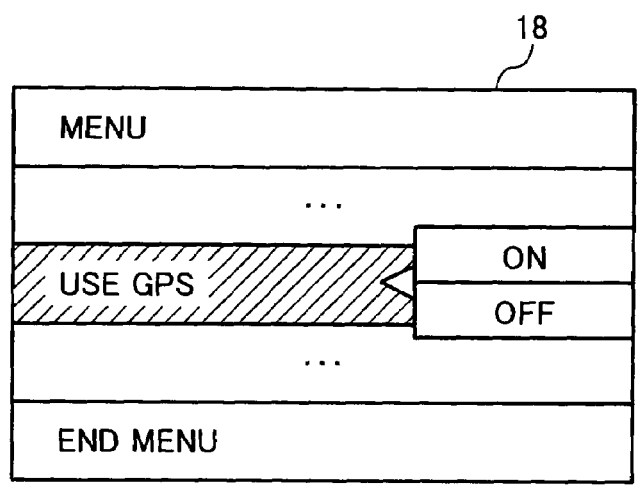
FIG. 5 is a schematic for explaining an example of a setup screen for specifying a usage of functions of location information acquiring and location information storing by a global positioning system (GPS)

FIG. 5 is a schematic for explaining an example of a setup screen for specifying a usage of functions of location information acquiring and location information storing by the GPS. "GPS used" is displayed on the display of the set-up screen to specify whether a function of location information acquiring and recording by the GPS is being used and one can select by choosing "on" and "off". The specified choice is saved in the flash memory 16 as the setting information, specifying whether the location information acquiring and recording function is being used or not.

Figure 6:
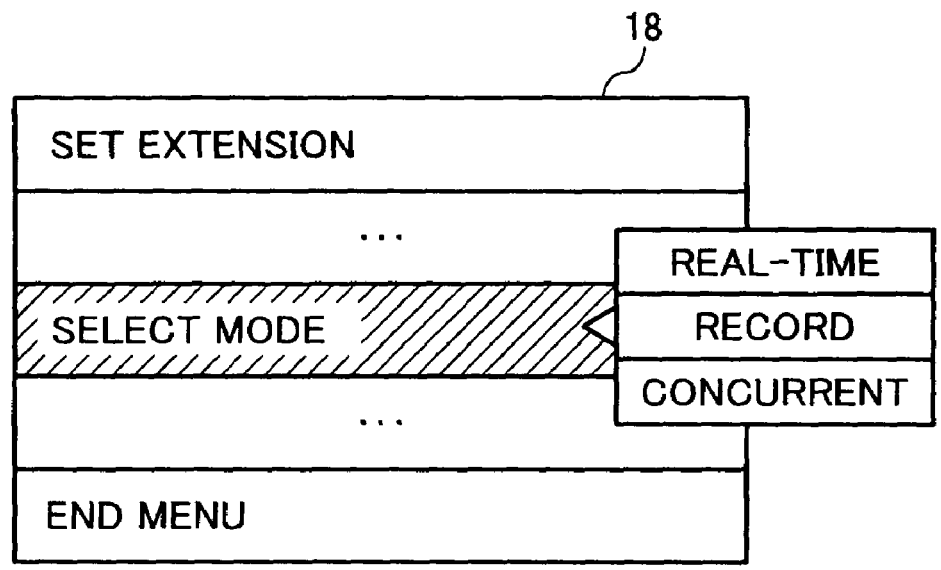
FIG. 6 is a schematic for explaining an example of a setup screen for inputting a setting of a location-information usage mode.

FIG. 6 is a schematic for explaining an example of a setup screen for inputting a setting of a location-information usage mode. As shown in FIG. 6, when "mode selection" is specified "real mode" is displayed for selecting the real-time location-information usage mode, "record" is displayed for selecting the stored-location-information usage mode, "concurrent" is displayed for selecting the location-information-combination usage mode, and any one of the three can be specified.

Figure 7:
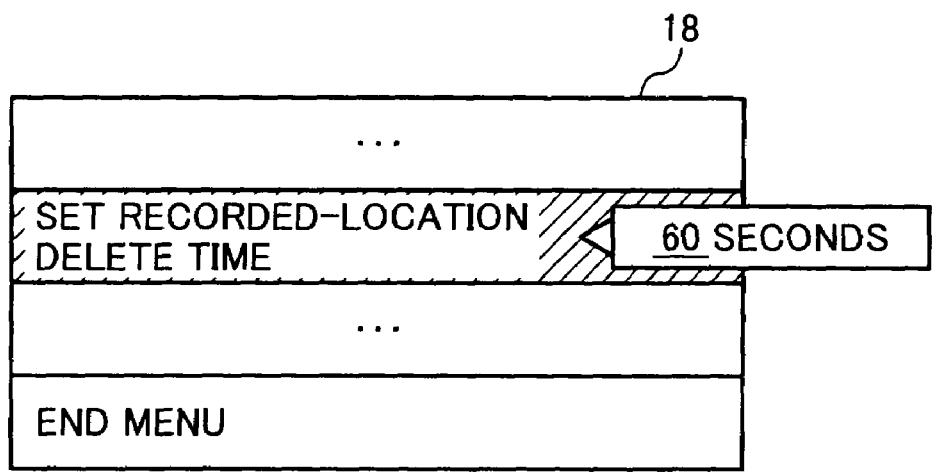
FIG. 7 is a schematic for explaining an example of a setup screen for inputting a setting of delete timing for the location information stored in an SDRAM.

FIG. 7 is a schematic for explaining an example of a setup screen for inputting a setting of delete timing for the location information stored in the SDRAM 13. As shown in FIG. 7, it is possible for the user to input lapsed time after recording the location, in "recorded location delete time". The lapsed time is stored in the flash memory 16 as the setting information. When the location-information acquiring unit 31 stores the location information into the SDRAM 13 as the stored-location information, it refers to the setting information, and when the specified time lapses after the time of recording the location, the stored-location information is deleted from the SDRAM 13.

Figure 8:
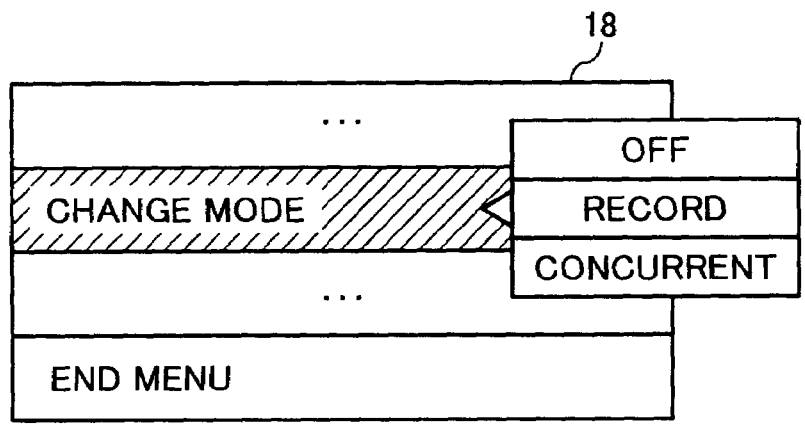
FIG. 8 is a schematic for explaining an example of a setup screen for inputting a setting of mode change.

FIG. 8 is a schematic for explaining an example of a setup screen for inputting a setting of mode change. As shown in FIG. 8, sub-items "off", "store", "concurrent" are displayed in "mode change" format item, when the item is set to "off", the command is stored in the flash memory 16 as the setting information. When the setting information is set to "off", mode transition is not performed by the mode control unit 33. In case of "record", the mode changes to the stored-location-information usage mode, in case of "concurrent", the mode changes to the location-information-combination usage mode.

The display control unit 34 changes the color of the characters of the location information depending on whether the location-information acquiring unit 31 is able to acquire the location information, and displays in the operation displaying unit 18. Specifically, when the display control unit 34 is able to acquire the location information, the information is displayed in white color. When the display control unit 34 is unable to acquire the location information, the real-time location information already on display, is displayed in orange color. When the location information saved in the SDRAM 13 is to be displayed as the stored-location information, the display is in blue color.

The input control unit 35 is a processing unit that accepts instructions regarding recording command and inputs such as the delete time setting, location-information usage modes, and mode change settings from the operation displaying unit 18.

Figure 9:
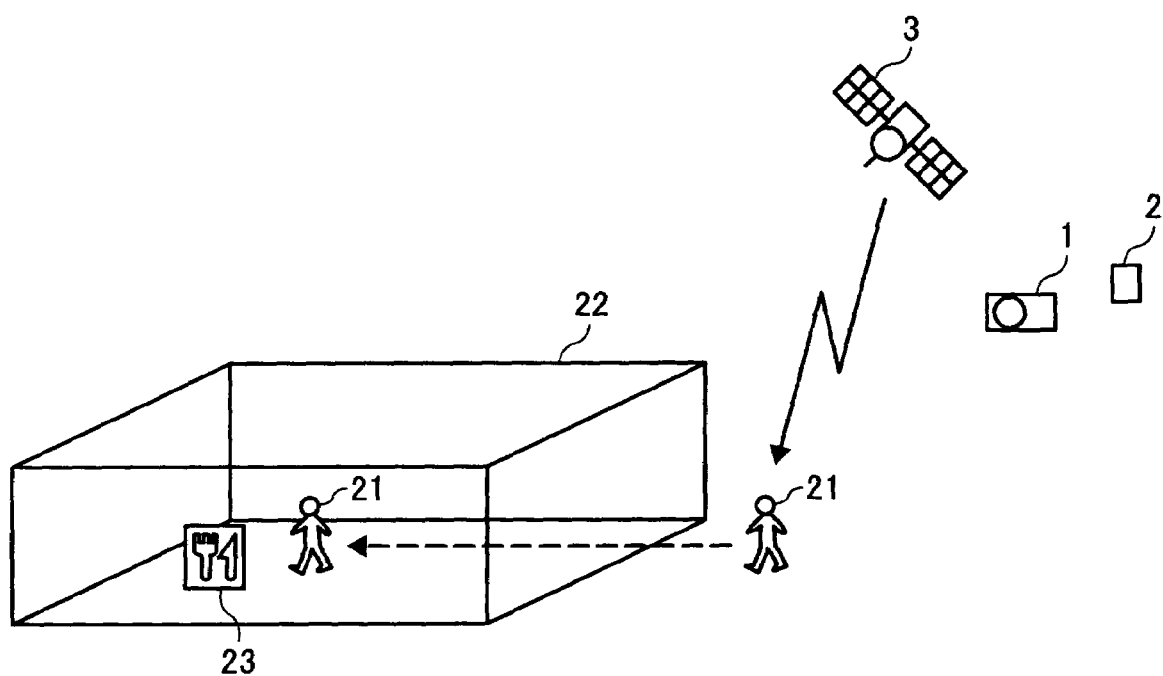
FIG. 9 is a schematic for explaining a usage pattern of the digital camera according to the present embodiment.

According to the present embodiment, in case of inability to acquire the GPS information, especially indoors, the GPS information is added to the image. FIG. 9 is a schematic for explaining a usage pattern of the digital camera 1.

In case a user 21 wishes to take a photograph of a subject 23 inside a building 22 (for example a cafeteria in the building 22) with the location information attachment, it is not possible to acquire the location information inside the building 22 according to the conventional system, because waves from the GPS satellite cannot reach inside.

Therefore, according to the present embodiment, the user 21, at first, acquires the location information outside the building 22 using the GPS receiver 2. The location information acquired through the GPS is recorded in the SDRAM 13 of the digital camera 1, as the stored-location information at that point of time. The user 21 then enters the building 22 and takes the photograph of the subject 23. At this time, the location information acquired outside the building 22 is recorded in the header portion of the image.

Figure 10:
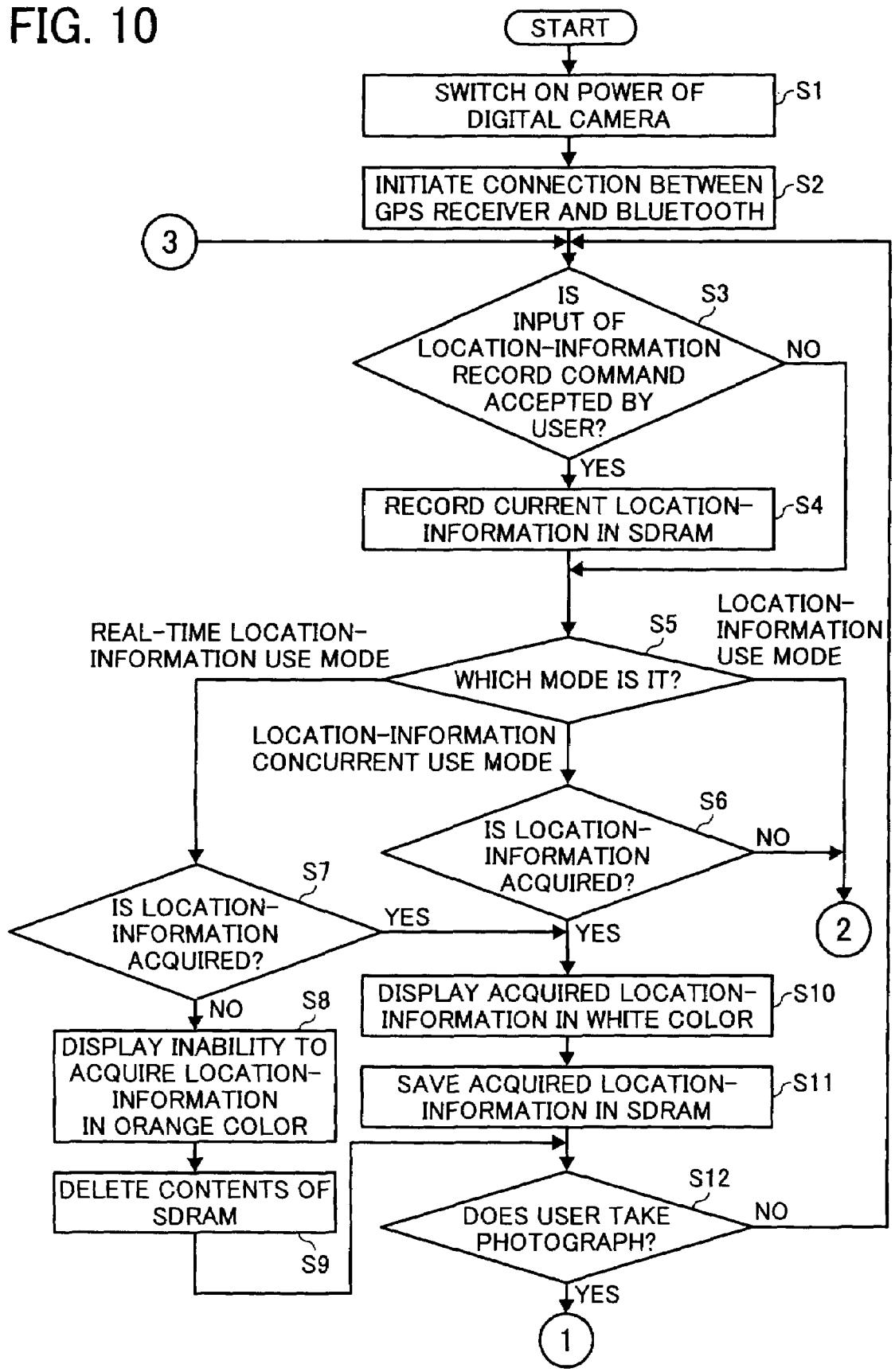
FIG. 10 is a flowchart of a location-information recording process by the digital camera according to the present embodiment.
Figure 11A:
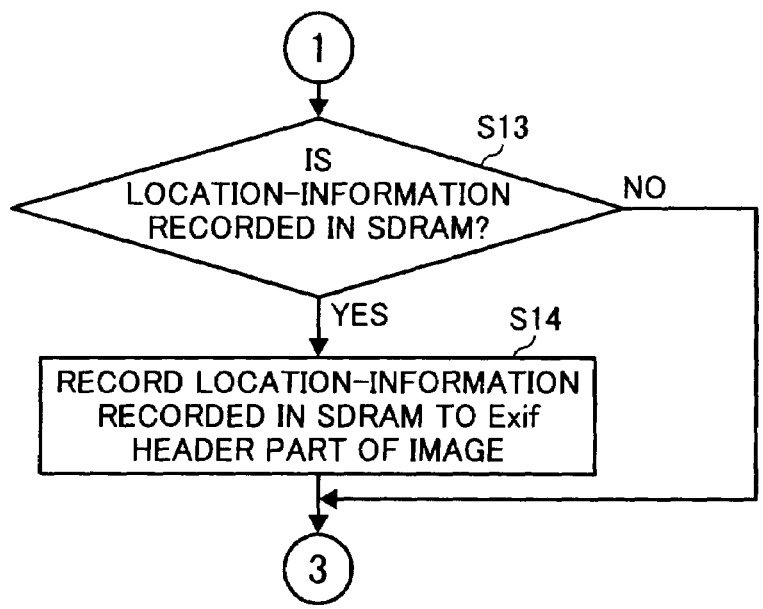
FIG. 11A is a flowchart of the location-information recording process by the digital camera according to the present embodiment (continued from FIG. 10)
Figure 11B:
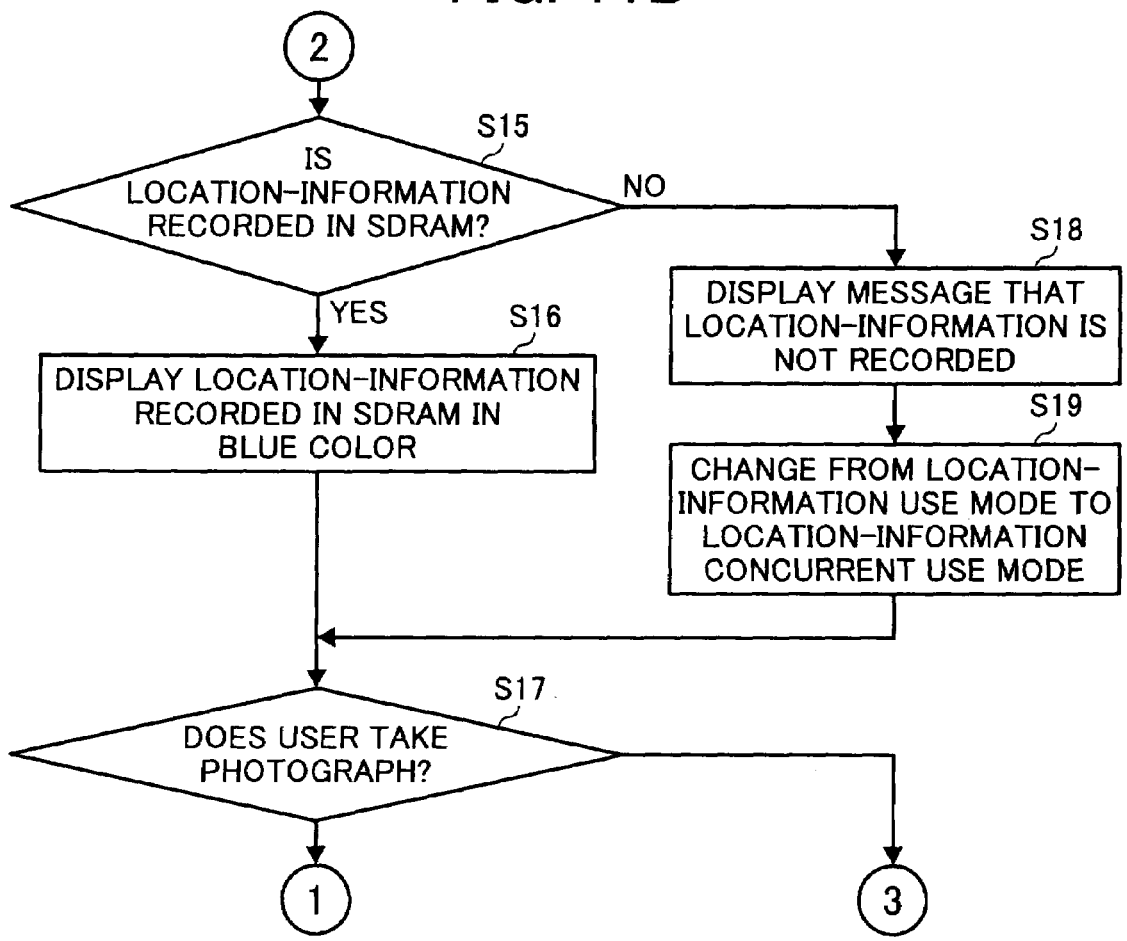
FIG. 11B is a flowchart of the location-information recording process by the digital camera according to the present embodiment (continued from FIG. 11A)

Following is the explanation regarding the operation of the digital camera 1, according to the present embodiment. FIGS. 10, 11A, and 11B are flowcharts of the location-information recording process by the digital camera 1.

The user, initially, switches on the power of the digital camera 1 (step S1). The digital camera 1 initiates connection with the GPS receiver 2 (step S2). The following explanation is on the assumption that the location information acquiring and recording functions of the GPS are "on" (in use), in FIGS. 10, 11A, and 11B. If the functions are "off" the following process cannot be executed.

Because the digital camera 1 and the GPS receiver 2 are connected by the Bluetooth (registered trademark), in step 2, the connection of the two starts, when the connection is completed properly, the digital camera 1 starts acquiring the location information from the GPS receiver 2. The location information is transmitted periodically by the GPS receiver 2, for example after every 1 second.

The user 21 wants to take the photograph of the subject 23 inside the building 22 with the location information; however, because it is not possible to acquire the location information inside the building 22, the user acquires the location information in front of the building 22 beforehand. At such time, pressing of a particular button in the operation displaying unit 18 by the user 21, sends a command to the CPU 11 of the digital camera 1 for recording currently acquired location information. After receiving the command for recording (Yes at step S3), the currently acquired location information is recorded into the SDRAM 13 (step S4). The information recorded into the SDRAM 13 is automatically deleted by the location-information acquiring unit 31, when the time input set into the set-up screen, as shown in FIG. 7, lapses.

Next the mode control unit 33 refers to the setting information in the flash memory 16, and determines currently set-up mode as the location-information usage mode (step S5), thus entering in a process loop of that particular mode.

When the location-information usage mode is already set-up to the real-time location-information usage mode, it is possible to automatically interchange the modes between the stored-location-information usage mode and the location-information-combination usage mode, at the time point when the user 21 records the location information in the SDRAM 13 of the digital camera 1. Thus, as shown in FIG. 8, it is possible to set-up the set-up screen in order to determine whether interchange of the modes is to be automatic, at the time point when the location information is recorded in the SDRAM 13 of the digital camera 1.

The real-time location-information usage mode uses only that information that is acquired at the real-time. The location-information acquiring unit 31 determines whether the location information is acquired or not (step S7). When it is not possible for the GPS receiver 2 to acquire the location information due to indoor environment (No at step S7), the display control unit 34 notifies the user of the inability to acquire the location information by displaying on the operation displaying unit 18. In case the real-time location information is displayed, the characters of the location information are displayed in orange color (step S8). Then, the location information in the SDRAM 13 is deleted (step S9) and the process proceeds to step S12.

At this stage, because the contents of the SDRAM 13 are deleted, even if the user 21 takes the photograph in step S12, the location information does not get recorded on the image. On the other hand, in step S7, if the GPS receiver 2 is able to acquire the location information (Yes at step S7); the display control unit 34 displays the acquired location information on the operation displaying unit 18 in white color. The displayed location information is periodically updated, depending on the location information received from the GPS receiver 2. The location-information acquiring unit 31 saves the received location information in the SDRAM 13 as the real-time location information (step S10). When the user 21 takes the photograph (Yes at step S12), the real-time location information saved in the SDRAM 13 is recorded on the header portion of the image (steps S13 and S14).

Referring back to step S3, when the location-information usage mode is set to the stored-location-information usage mode, it is necessary to confirm whether the location information is stored as the stored-location information (step S15). Next, When the location information is recorded (Yes at step S15), it is displayed on the operation displaying unit 18 in blue color (step S16). When the user 21 takes the photograph (Yes at step S17), the stored-location information saved in the SDRAM 13 is recorded on the header portion of the image (Yes at step S13, step S14).

On the other hand in step S15, when the location information is not recorded in the SDRAM 13 (No at step S15), the display control unit 34 displays on the operation displaying unit 18 of the digital camera 1 that the location information is not recorded (step S18). The mode control unit 33 refers to the setting information of the flash memory 16, and if the setting information is set to "concurrent", changes the location-information usage mode to the location-information-combination usage mode (step S19). If the setting information is set to any other mode than "concurrent", the location-information usage mode cannot be changed.

It is possible to set the setting information to automatic change to the real-time location-information usage mode, and in case there is no automatic change and the location information is not recorded, the setting in the header portion of the-image can be set to "no record".

Referring back to-step S3, when the location-information usage mode is the location-information-combination usage mode, the location-information acquiring unit 31 confirms whether the location information is currently acquired (step S6). When the location information is acquired (Yes at step S6), the display control unit 34 displays the acquired location information in white color in the operation displaying unit 18 (step S10). The displayed location information is updated periodically as and when the location information is received from the GPS receiver 2.

The location-information acquiring unit 31 saves the received location information in the SDRAM 13 (step S11). When the user takes the photograph (Yes at step S11), the location information saved in the SDRAM 13 is recorded on the header portion of the image (Yes at step S13, step S14).

In step S6, if the location information is not acquired (No at step S6), the display control unit 34 finds out whether the location information is recorded in the SDRAM 13 (step S15).

If the location information is recorded (Yes at step S15), the display control unit 34 displays the stored-location information in blue color in the operation displaying unit 18 (step S16). If the user takes the photograph (Yes at step S17), the location information saved in the SDRAM 13 is recorded on the header portion of the image (Yes at step S13, step S14).

In step S15, when the location information is not recorded (No at step S15), the display control unit 34 displays in the operation displaying unit 18 that the location information is not recorded (step S18), and the location information is not recorded on the image (Steps S19 and S17).

Figure 12:
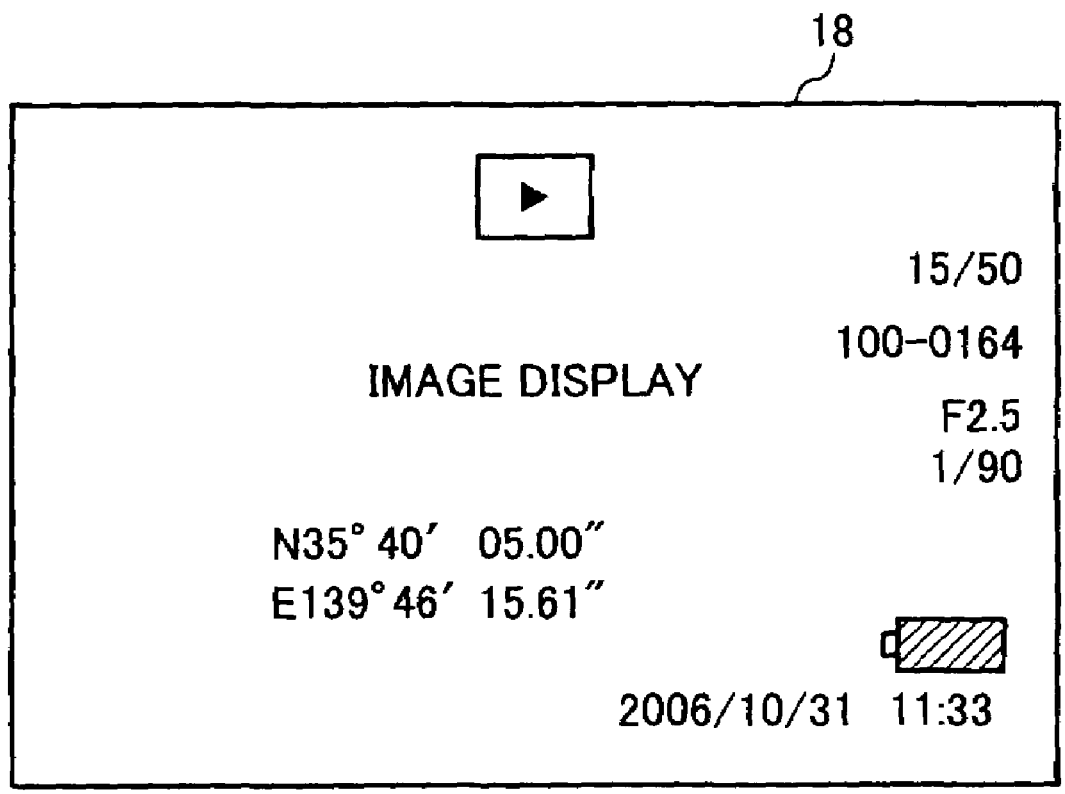
FIG. 12 is a schematic for explaining an example of the shot image including the location information displayed on an operation displaying unit.

Thus, when the location information recorded on the Exif header portion of the image is displayed on the liquid crystal display unit of the operation displaying unit 18 by the display control unit 34, it is displayed along with image data and other Exif data (such as ISO and exposure). FIG. 12 is a schematic for explaining an example of the shot image including the location information displayed on the operation displaying unit 18. As shown in FIG. 12, location information 1201 including longitude and latitude is displayed along with the image data and other Exif data (such as ISO and exposure).

Thus, the digital camera 1 according to the present embodiment sets the stored-location-information usage mode and the location-information-combination usage mode other than the real-time location-information usage mode, and uses the location information received from the GPS receiver 2 in the past, by saving the location information in the SDRAM 13. Thus, it is possible to record the location information on the header portion of the image even when the GPS receiver 2 is not useful indoors, making it convenient for the user to record the location information on the image.

An imaging program executed by the digital camera 1 according to the present embodiment is provided by being installed in the ROM 12 in advance.

The imaging program executable by the digital camera 1, according to the present embodiment, can be stored in computer-readable recording media such as a compact disk-read only memory (CD-ROM), a flexible disk (FD), a compact disk-recordable (CD-R), and a digital versatile disk (DVD) in the form of an installable and executable file.

The imaging program executable by the digital camera 1, according to the present embodiment, can be stored on a computer connected to networks such as the Internet and the likes and can be distributed or downloaded via a network such as the Internet.

The imaging program executable by the digital camera 1, according to the present embodiment, is a module configuration that includes various parts such as the location-information acquiring unit 31, the location-information recording unit 32, the mode control unit 33, the input control unit 35, and the display control unit 34. The imaging program executable by the digital camera 1, according to the present embodiment, can be read and executed by the hardware such as the CPU 11 via the ROM 12, and the respective units mentioned above can be loaded on to and realized by the main storing device.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An imaging device comprising:
   a location-information storing unit that stores therein location information;
   a location-information acquiring unit that acquires the location information from a location detecting device that detects a current location, and stores acquired location information in the location-information storing unit;
   an image storing unit that stores an image in an image storing unit with stored location information;
   an operation displaying unit that displays thereon the image with a plurality of screens for various settings, and receives an input of a command from a user;
   a display control unit that displays a first input screen for performing an input of a delete timing setting for the location information on the operation displaying unit;
   an input control unit that receives the input of the delete timing setting from the first input screen, wherein
   the location-information acquiring unit deletes the stored location information at input delete timing.

2. The imaging device according to claim 1, wherein
   the input control unit further receives a command for storing the location information, and
   the location-information acquiring unit stores the location information in the location-information storing unit at a time when the command for storing the location information is received.

3. The imaging device according to claim 1, wherein
   the image storing unit stores the image in the image storing unit with location information acquired at a time of shooting the image.

4. The imaging device according to claim 3, further comprising:
   a setting-information storing unit that stores therein a usage mode of the location information as setting information; and
   a mode control unit that sets the usage mode in the setting-information storing unit, wherein
   the display control unit further displays a second input screen for performing an input of a usage mode setting on the operation displaying unit,
   the input control unit further receives an input of a real-time location-information usage mode in which the location information acquired at the time of shooting the image is recorded alone in a header portion of the image, as the usage mode from the second input screen by a user,
   when the input of the real-time location-information usage mode is received, the mode control unit sets the real-time location-information usage mode as the usage mode in the setting-information storing unit, and
   when the real-time location-information usage mode is set in the setting-information storing unit, the image storing unit stores the image in the image storing unit with the location information acquired at the time of shooting the image.

5. The imaging device according to claim 4, wherein
   the input control unit further receives an input of a stored-location-information usage mode in which the stored location information is recorded in the header portion of the image regardless of detection of the current location, as the usage mode from the second input screen by the user,
   when the input of the stored-location-information usage mode is received, the mode control unit sets the stored-location-information usage mode as the usage mode in the setting-information storing unit, and
   when the stored-location-information usage mode is set in the setting-information storing unit, the image storing unit stores the image in the image storing unit with the stored location information.

6. The imaging device according to claim 5, wherein
   the mode control unit sets the stored-location-information usage mode as the usage mode in the set information storing unit at a time when the location-information acquiring unit stores the acquired location information in the location-information storing unit.

7. The imaging device according to claim 6, wherein
   when the detection of the current location is possible, the image storing unit stores the image with the location information acquired at the time of shooting the image, and
   when the detection of the current location is not possible, the image storing unit stores the image with the stored location information.

8. The imaging device according to claim 7, wherein
   the input control unit further receives an input of a location-information-combination usage mode in which a record of the location information acquired at the time of shooting the image in the header portion the image is used in combination with a record of the stored location information in the header portion of the image, as the usage mode from the second input screen by a user,
   when the input of the location-information-combination usage mode is received, the mode control unit sets the location-information-combination usage mode as the usage mode in the setting-information storing unit, and
   when the location-information-combination usage mode is set in the setting-information storing unit, the image storing unit stores the image with the location information acquired at the time of shooting the image when the detection of the current location is possible, and stores the image with the stored location information when the detection of the current location is not possible.

9. The imaging device according to claim 8, wherein
   the mode control unit sets the location-information-combination usage mode as the usage mode in the setting-information storing unit at a time when the location-information acquiring unit stores the acquired location information in the location-information storing unit.

10. The imaging device according to claim 1, wherein
    the display control unit displays the location information on the operation displaying unit.

11. The imaging device according to claim 10, wherein
    the display control unit changes a display format of the location information to be displayed on the operation displaying unit, depending on whether the location information acquiring unit is able to acquire the location information.

12. The imaging device according to claim 11, wherein the display control unit changes a color of a character of the location information to be displayed on the operation displaying unit, depending on whether the location information acquiring unit is able to acquire the location information.

13. A method of recording location information, comprising:
- acquiring the location information from a location detecting device that detects a current location;
- storing acquired location information in a location-information storing unit;
- storing an image in an image storing unit with stored location information;
- displaying on an operation displaying unit the image with a plurality of screens for various settings, and receiving an input of a command from a user;
- displaying on the operation displaying unit a first input screen for performing an input of a delete timing setting for the location information;
- receiving the input of the delete timing setting from the first input screen; and
- deleting the stored location information at the input delete timing.

14. A computer program product comprising a computer usable medium having computer readable program codes embodied in the medium that when executed cause a computer to execute:
- acquiring the location information from a location detecting device that detects a current location;
- storing acquired location information in a location-information storing unit;
- storing an image in an image storing unit with stored location information;
- displaying on an operation displaying unit the image with a plurality of screens for various settings and receiving an input of a command from a user;
- displaying on the operation displaying unit a first input screen for performing an input of a delete timing setting for the location information;
- receiving the input of the delete timing setting from the first input screen; and
- deleting the stored location information at the input delete timing.

* * * * *